H. McCLEARY.
MUFFLER CUT-OUT FOR AUTOMOBILES.
APPLICATION FILED MAR. 8, 1910.

971,458.

Patented Sept. 27, 1910.

WITNESSES:
H.C. Barry
Perry B. Turpin

INVENTOR
Harry McCleary
BY Munn & Co.
ATTORNEYS

UNITED STATES PATENT OFFICE.

HARRY McCLEARY, OF WASHINGTON, DISTRICT OF COLUMBIA, ASSIGNOR OF ONE-HALF TO JAMES BENDION, OF WASHINGTON, DISTRICT OF COLUMBIA.

MUFFLER CUT-OUT FOR AUTOMOBILES.

971,458. Specification of Letters Patent. Patented Sept. 27, 1910.

Application filed March 8, 1910. Serial No. 548,097.

*To all whom it may concern:*

Be it known that I, HARRY MCCLEARY, a citizen of the United States, and a resident of Washington, in the District of Columbia, have invented certain new and useful Improvements in Muffler Cut-Outs for Automobiles, of which the following is a specification.

This invention is a muffler cut-out for automobiles, and has for an object to provide a novel construction whereby the discharge from an engine to the muffler may be cut out in advance of the muffling device, affording a free discharge whenever desired, for the purpose well known to those skilled in the use of this class of devices.

The invention consists in certain novel constructions and combinations of parts as will be hereinafter described and claimed.

Figure 1:
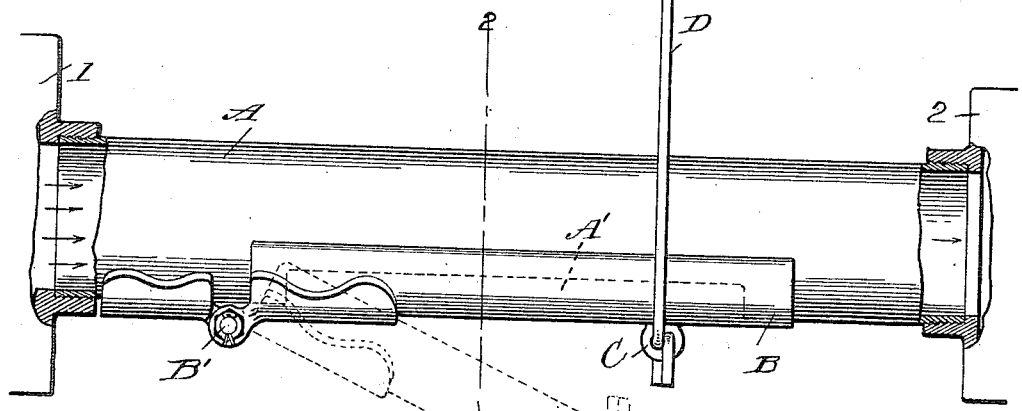
Figure 2:
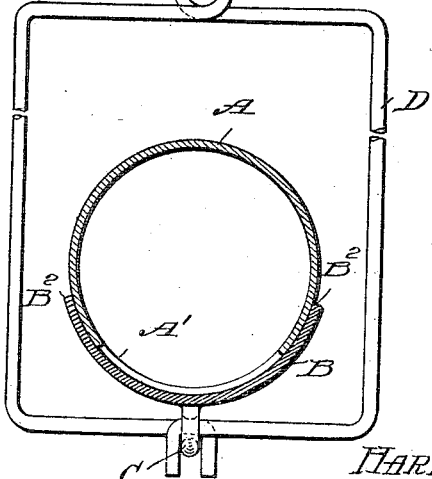

In the drawing: Figure 1 is a side view, partly in section, and Fig. 2 is a cross section on about line 2—2 of Fig. 1, of an apparatus embodying my invention.

The cut-out is provided in the pipe A leading from the engine 1 to the mufflers 2, and consists of a gate B conformed in cross section to that of the pipe A, and arranged to close over an opening A' formed in the bottom of the pipe A, and elongated in the direction of length thereof with the gate B lapping at its side edges and ends upon the pipe alongside the opening A', and closing said opening when the gate B is in closed position, as shown in Fig. 1 of the drawing. The gate B is hinged at B', at its end next the engine or motor 1, so its other end or end next the muffler may be dropped, as indicated in dotted lines, Fig. 1, to clear the opening A' to permit the discharge of the exhaust from the engine 1, and so that the gate, when in its dotted line position, will operate as a guide for the discharged products when open, as indicated in dotted lines in Fig. 1. On its inner face the gate B conforms to the curvature of the pipe A, and at its sides the gate B will operate at B² to clear off any mud or other accumulation on the outer side of the pipe, which would otherwise interfere with the closing of the gate from the dotted line to the full line position, shown in Fig. 1.

It will be noticed that the gate will open by gravity, starting when released from the full line position of Fig. 1 to the dotted line position in the same figure, and in practice the gate is lifted to closed position when desired. In carrying out this feature of my invention, I provide the gate B on its under side near its rear free edge with an eye C, and a link D passes through the eye C and extends above the pipe A and may be connected with a cord or wire E leading upwardly into convenient reach of the operator so the gate can be conveniently closed whenever desired, or it can be released and permitted to drop to its open position. The link D not only operates as a means to facilitate the closing of the gate, but it also operates to limit the opening movement of the gate, by engaging upon the upper side of the pipe A, when the gate drops so that the link limits the downward or opening movement of the gate, as before suggested.

It will be noticed that when the gate is closed, it laps upon the outer side of the pipe A, and is not dependent upon fitting into the opening A', so that accumulations of carbon and the like in the connecting pipe between the motor and the muffler will not interfere with the closing movement of the gate, so that the gate may be freely opened and readily closed whenever desired in the use of the machine.

I claim:

A muffler cut-out comprising in combination with a pipe having an opening in its bottom elongated in the direction of length of the pipe, a gate curved in cross section to conform to the contour of the pipe and adapted to fit over the opening in the pipe and to extend laterally and longitudinally beyond the same, a hinge connecting one end of the gate with the pipe, an eye on the pipe near its swinging end, and a link passed through said eye and extending above the pipe and adapted to rest upon the pipe and limit the opening movement of the gate, all substantially as and for the purposes set forth.

HARRY McCLEARY.

Witnesses:
SOLON C. KEMON,
PERRY B. TURPIN.